United States Patent Office 3,225,061
Patented Dec. 21, 1965

---

3,225,061
DERIVATIVES OF 2,5-DIARYLPYRROLE
Harry Braus, Springdale, and Fred D. Waas, Cincinnati, Ohio, assignors to National Distillers and Chemical Corporation, New York, N.Y., a corporation of Virginia
No Drawing. Filed Oct. 17, 1962, Ser. No. 231,276
5 Claims. (Cl. 260—313)

The present invention relates to new optical brightening agents and processes for the preparation thereof.

The yellowish appearance in daylight of many plastics and resins limits their application for both practical and esthetic reasons. Consequently, there has been considerable activity in the field relating to the discovery of compounds which will, when incorporated into a resin or plastic, convert the ultraviolet light impinging thereon into blue fluorescent light thereby imparting to the resin or plastic a brighter or whiter appearance in daylight. Such compounds or additives are known as optical brighteners or optical bleaches.

To function satisfactorily as an optical brightener for plastics or resins, a material must first be capable of fluorescing in the region of ultraviolet light present in normal sunlight. The material must also be compatible with the resin or plastic, and must remain stable under the conditions to which the resultant composition is subjected. The material must not introduce into the resin undesirable residues or properties which will have a deleterious effect on the original inherent desirable properties of the resin or plastic. The material must not undergo harmful side reactions or bleed out of the medium being protected. It must be colorless and odorless, or nearly so, and insoluble in water. From an economic standpoint, the optical brightener should be capable of synthesis from readily available starting materials by a relatively simple process so as to be inexpensive; it should also be effective in small quantities relative to the quantity of plastic or resin.

According, it is one object of this invention to provide novel compounds which will function satisfactorily as optical brighteners.

It is a further object of this invention to prepare novel plastic compositions of improved optical brightness by incorporating into a plastic a small amount of one or more of the above-noted compounds.

The novel optical brightening agents which are the subject hereof have the following general formula:

(1)

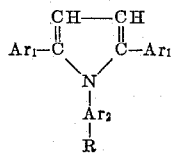

in which $Ar_1$ and $Ar_2$ are aryl radicals, e.g., phenyl, anthryl, naphthyl, phenanthryl, etc., and R represents radicals of the type $-HN_2$, $-NHCOCH_3$, or

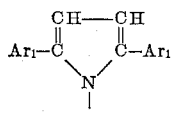

As specific examples of these compounds there may be mentioned:

1-(4'-aminophenyl)-2,5-diphenylpyrrole,
1-(4'-acetylaminophenyl)-2,5-diphenylpyrrole,
N,N'-(p-phenylene)di(2,5-diphenylpyrrole),
1-(4'-aminonaphthyl)-2,5-dinaphthylpyrrole,
1-(4'-acetylaminonaphthyl)-2,5-dinaphthylpyrrole,
1-(3'-aminophenyl)-2,5-diphenylpyrole.

In preferred embodiment are those compounds represented by the following formula:

(2)

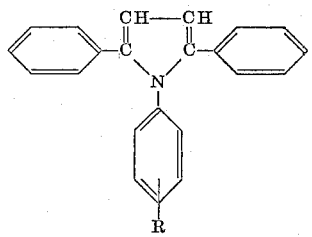

Wherein R may be radicals of the type $-NH_2$, $-NHCOCH_3$, or

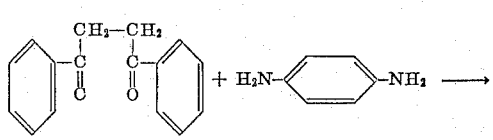

In other words, referring to generic formula (1) above, the preferred embodiments are those in which the Ar groups are both phenyl.

The novel compounds of this invention, in terms directed toward the compounds of Formula (2), are prepared by condensing dibenzoylethane with varying ratios of a phenylenediamine or an aminoacetanilide as illustrated by the following equations where in dibenzoylethane is condensed with various ratios of p-phenylenediamine and p-aminoacetanilide:

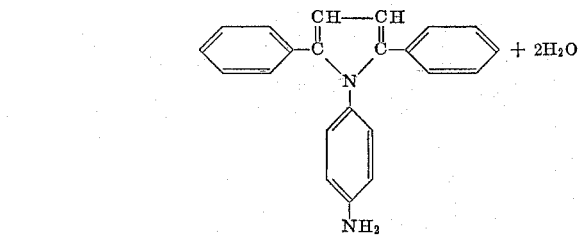

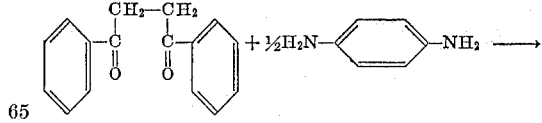

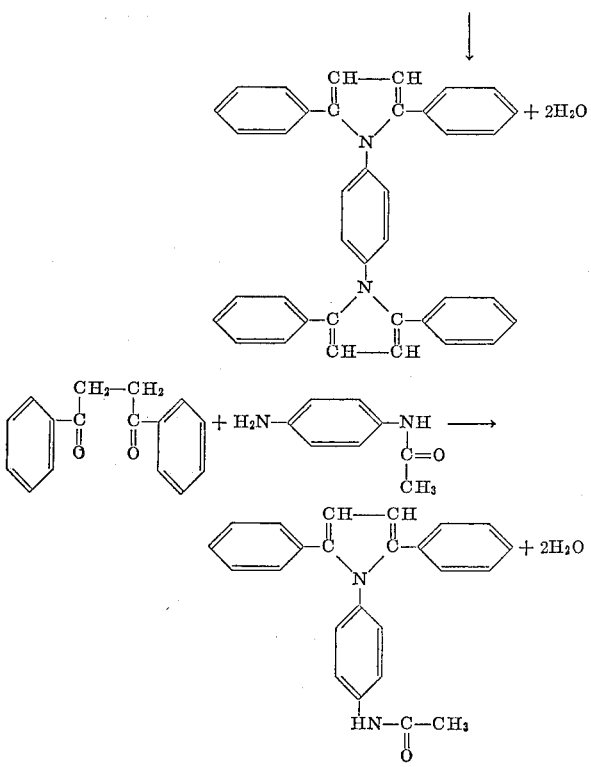

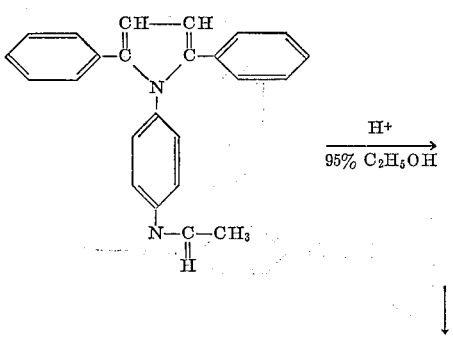

The 1,2-dibenzoylethanes used as a starting material in the process embodied herein may be prepared by any convenient method. Known methods of preparation include, for example, a Friedel-Crafts reaction between benzene and fumaryl chloride followed by reduction with zinc and acid, or reduction of debenzoyl ethylene with tin amalgam and hydrochloric acid in ethanol. The p-phenylene diamine starting material is readily available commerically. p-Aminoacetanilide may conveniently be prepared by acetylating p-nitroaniline with acetic anhydride in benzene followed by hydrogenation in alcohol over a platinum catalyst.

In addition, the starting materials may further contain constituents in positions which do not affect the condensation reaction, such as ethyl, methyl, ethoxy or methoxy groups, or halogen atoms such as chlorine, or nitro groups.

To effect the above reactions, the stoichiometric proportions of dibenzoylethane and p-phenylenediamine or its acetyl derivative can be heated in admixture until evolution of the co-produced water ceases.

An alternate method of producing 1-(4'-aminophenyl)-2,5-diphenylpyrrole is to submit the acetyl derivative to aqueous alcoholic hydrolysis:

A more preferred method of preparation involves carrying out the condensation reaction in the presence of a suitable solvent and a suitable catalyst. Suitable solvents are principally high boiling solvents, for example, substitution products of benzene, such as nitrobenzenes, monochlorobenzene, dichlorobenzenes, trichlorobenzenes, as well as high boiling hydrocarbons of the benzene series, such as toluene, xylene, or cumene. Effective catalysts include acidic condensation catalysts such as toluene sulfonic acid, sulfuric acid, phosphoric acid, titanium tetrachloride, etc.

Generally, the condensation reaction proceeds with the ready evolution of water at temperatures within the range of 100° to 200° C. at atmospheric pressure and at correspondingly lower temperature under reduced pressure.

The resultant condensation product may be separated from the reaction mixture by any standard procedure, such as, for example, by distilling off the solvent or by adding a nonsolvent such as a lower alcohol, e.g., ethanol, isopropanol, etc. Recrystallization of the product can be carried out in solvents such as benzene, toluene, nitrobenzene, dimethylformamide, nitromethane, etc.

The compounds of the present invention are stable, odorless, colorless solids which are insoluble in water and soluble in certain organic solvents, e.g., benzene, toluene, chlorobenzene, nitrobenzene, dimethylformamide, etc. They have been found to be excellent fluorescent pigments. They are compatible with resinous and plastic compositions of various types, such as polyolefins, as for example polyethylene and polypropylene, polystyrene, polyvinyl chloride, acrylonitrile polymers, acrylates such as methyl acrylate and methyl methacrylate, as well as copolymers and terpolymers of the foregoing and the like. Further, the aryl groups, and where present, the aromatic amino groups, of the subject novel compounds provide convenient sites for desirable modifications of the compounds to forms more suitable for a variety of specific applications. For example, one or more of the aryl groups may be substituted by halogens, sulfonic acid, sulfonamide, nitro groups, and the like. The aromatic amino group may be subjected to many of the reactions typical for aniline, e.g., salt formation, acylation, diazotization, and the like.

The incorporation of a small amount of one or more of the compounds of this invention in a resinous composition provides a novel composition which, under sunlight, appears whiter or brighter than the original resin. The effect is particularly noticeable and of great commercial importance for resin compositions normally exhibiting a yellowish appearance in sunlight.

The addition of one or more of these compounds does not, however, inhibit in any way the gelation and cure rate of the resinous material. The enhancement of whiteness or brightness without deterioration of other desirable physical properties is particularly important when dealing with a resinous material which is intended to be fabricated into an article of clothing, such as rainwear, into a packaging film for foods or the like, or into rigid molded implements or decorative items, such as food containers, radio cabinets, etc., where whiteness or brightness or the absence of a yellowish tint is of considerable concern.

In general, the amount of the subject novel compounds utilized for incorporation into the plastic compositions which are to be optically brightened may be varied depending on the desired improvement in optical brightness. Generally, the stated novel compounds may be used in amounts of from about 0.01% to about 1.0% by weight of the plastic, and preferably in amounts of from 0.05 to 0.2%.

The optical brighteners may be incorporated into the polymer by any of several suitable methods known to those skilled in the art for providing a uniform mixture of a plastic and an additive material. Such methods include the addition of the stated compounds as solids, as solutions in inert solvents, or as slurries in nonsolvents, to the plastic in either dry fluff or molding powder form followed by drying and tumbling. The stated compounds may also be incorporated into the plastic by melt blending the ingredients in conventional apparatus, such as a Banbury mixer, heated rolls, etc. It is also possible to incorporate the stated compounds into a plastic (e.g., polystyrene) by adding them to the monomer prior to polymerization, and then conducting the polymerization in the presence of the additive.

The following are typical examples of the application of this invention. It is not intended, however, that the invention be strictly limited thereto. Except where otherwise specified, all parts are given by weight.

*Example I*

1,2-dibenzoylethane was prepared by carrying out the well-known Friedel-Crafts reaction between benzene and fumaryl chloride to yield 1,2-dibenzoylethylene followed by the usual zinc and acid reduction.

4.8 parts of 1,2-dibenzoylethane, 2.2 parts of p-phenylenediamine, and 0.3 parts of p-toluenesulfonic acid were dissolved in 60 parts of nitrobenzene. The solution was brought to a moderate reflux by heating, and maintained at reflux while the water produced was removed by periodic venting. When no more water formed, the solution was cooled and then treated with from 75 to 150 parts of ethanol. The resultant precipitate was filtered off, washed several times with ethanol, recrystallized from nitromethane, and dried. A pale, crystalline powder melting at 241–242° C. was obtained, which corresponds to the formula

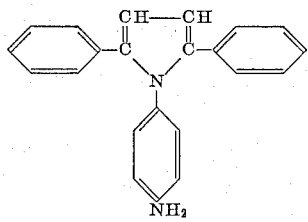

*Analysis.*—$C_{22}H_{14}N_2$ calculated: C=85.16; H=5.80; N=9.03. Found: C=84.98; H=5.75; N=9.13.

A sample of the product, when exposed to ultraviolet light of 2700–3000 λ wave length, exhibited a strong blue fluorescence.

*Example II*

The procedure of Example I was repeated except that 9.6 parts of 1,2-dibenzoylethane was used and the product was recrystallized from dimethylformamide. A pale crystalline powder melting at 302–304° C. was obtained, which corresponds to the formula

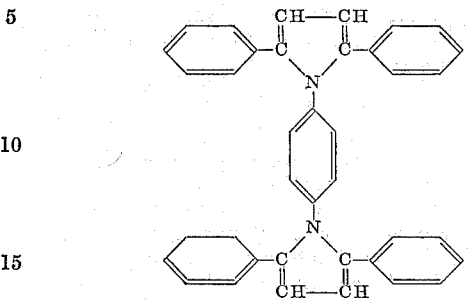

*Analysis.*—$C_{38}H_{28}N_2$ calculated: C=89.06; H=5.46; N=5.46. Found: C=88.79; H=5.29; N=5.39.

A sample of this material emitted a strong blue fluorescence when exposed to ultraviolet light.

*Example III*

7.2 parts of 1,2-dibenzoylethane, 4.5 parts of p-aminoacetanilide, and 0.45 parts of p-toluenesulfonic acid were dissolved in 60 parts of nitrobenzene and reacted according to the procedure of Example I. The product, after recrystallizing from benzene and drying, was a pale crystalline solid melting at 270–272° C. It corresponds to the formula

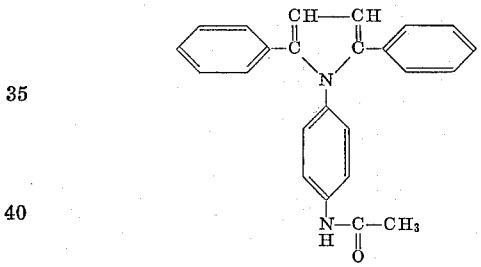

*Analysis.*—$C_{24}H_{20}N_2$ calculated: C=81.8; H=5.68; N=7.95. Found: C=81.4; H=5.49; N=7.69.

When a sample of this material was exposed to ultraviolet light, it exhibited a strong blue fluorescence.

*Example IV*

1.5 parts each of the compounds of Examples I, II and III were milled into 300 parts of a commercial polyethylene (density, 0.917 g./cc.; melt index, 2.0) using a heated roll mill at a temperature of 275° to 300° F. The resultant plastic sheets were uniformly white in appearance. When compared visually with a sheet of the polyethylene prepared in the same manner without one of the additives, the sheets containing an additive were noticeably whiter in appearance. When exposed to an ultraviolet lamp, the polyethylene sheets with additive emitted a blue fluorescence; the polyethylene without, did not.

*Example V*

Example IV was repeated except that 0.5 part of the compounds of Examples I, II, and III were used with 300 parts of the polyethylene each. The resultant plastic sheets were noticeably whiter and brighter than the untreated control, and emitted a blue fluorescence under an ultraviolet lamp.

*Example VI*

1.5 parts each of the compounds of Examples I, II, and III were uniformly blended with 300 parts of a commercial polypropylene (density, 0.904 g./cc.; melt index, 3.0 at 230° C.) by means of a heated roll mill at a temperature of 330° to 340° F. The resultant plastic sheets had a uniform white appearance in normal daylight. When compared visually with a sheet of untreated polypropylene, the sheets containing additive appeared markedly whiter. When exposed to an ultraviolet light, the polypropylene sheets with additive gave off a blue fluorescence; the polypropylene without additive did not fluoresce.

*Example VII*

To separate 100 part portions of styrene monomer were added 0.1 part of the compounds of Example I, II, and III followed by 0.05 part portions of benzoyl peroxide catalyst. Polymerizations commenced and were carried out over a period of about 6 hours at a temperature below 100° C. The resultant polymers were colorless, transparent solids. When placed under a fluorescent lamp, each of the polymers exhibited a blue florescence. Polystyrene prepared in the same manner, but without additive had a pale, yellow color and did not fluoresce when exposed to ultraviolet light.

It will be understood that numerous variations and changes may be made from the specific description and examples set forth above without departing from the spirit and scope of this invention.

What is claimed is:
1. 1-(4'-aminophenyl)-2,5-diphenylpyrrole.
2. 1-(4'-acetylaminophenyl)-2,5-diphenylpyrrole.
3. N,N'-(p-phenylene)di(2,5-diphenylpyrrole).
4. A compound of the formula

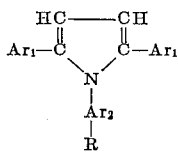

wherein $Ar_1$ is a member selected from the group consisting of phenyl anthryl, naphthyl, and phenanthryl, $Ar_2$ is a member selected from the group consisting of phenyl, anthryl, naphthyl, and phenanthryl, and R is a member selected from the group consisting of —$NH_2$, —$NHCOCH_3$,

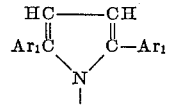

5. The compound of claim 4 where $Ar_2$ is phenyl.

References Cited by the Examiner
UNITED STATES PATENTS

| | | | |
|---|---|---|---|
| 2,478,452 | 8/1949 | Bishop et al. | 260—313 |
| 2,488,336 | 11/1949 | Scott | 260—313 |
| 2,983,686 | 5/1961 | Konig et al. | 252—301.2 |
| 2,986,564 | 5/1961 | Rips et al. | 260—313 |
| 3,005,779 | 10/1961 | Ackermann et al. | 252—301.2 |
| 3,068,236 | 12/1962 | Krapcho | 260—313 |

OTHER REFERENCES

Buu-Hoi et al.: Jour. of Medicinal and Pharm. Chem., vol. 1, No. 4 (1959) pages 319–325.

Hazelwood et al.: Chem. Abstracts, vol. 32 (1938), par. 1695–1696. Abstract of Jour. Proc. Roy Soc. N. S. Wales, vol. 71 (1937) pages 92–102.

Rips et al.: Jour. Org. Chem., vol. 25 (1960), pages 390–392.

NICHOLAS S. RIZZO, *Primary Examiner.*

MAURICE A. BRINDISI, *Examiner.*

ROBERT D. EDMONDS, MARY O'BRIEN,
*Assistant Examiners.*